Oct. 9, 1962 R. H. LALLEMAND ETAL 3,057,134
MEANS FOR PROVIDING AN ENCIRCLING COVER STRIP
AROUND A PACK OF PAPER OR THE LIKE
Filed Sept. 29, 1960 10 Sheets-Sheet 1
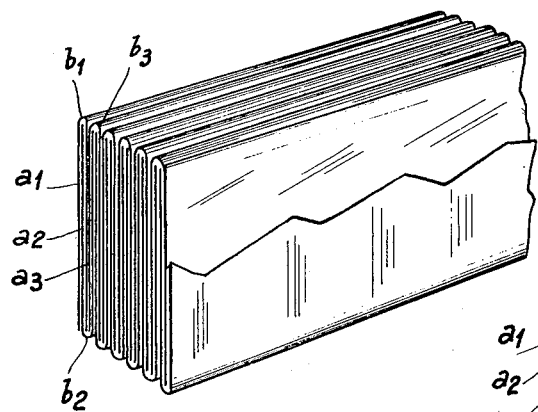
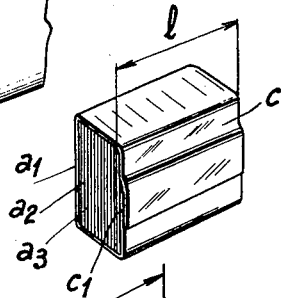
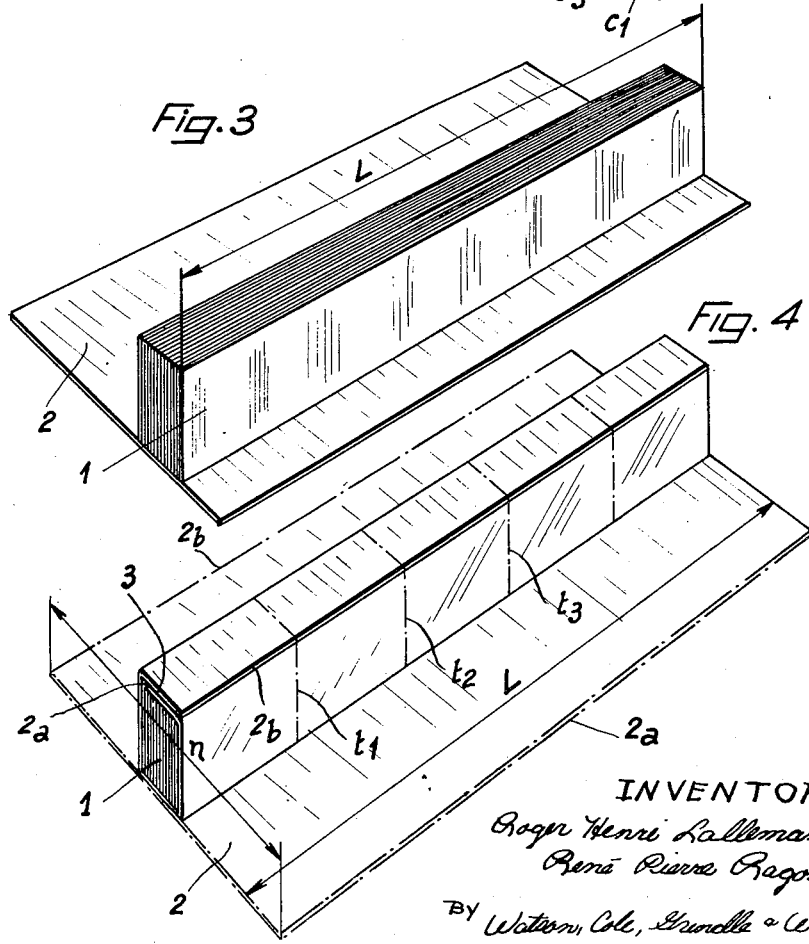
INVENTORS
Roger Henri Lallemand
René Pierre Ragon
BY Watson, Cole, Grindle & Watson
ATTORNEYS

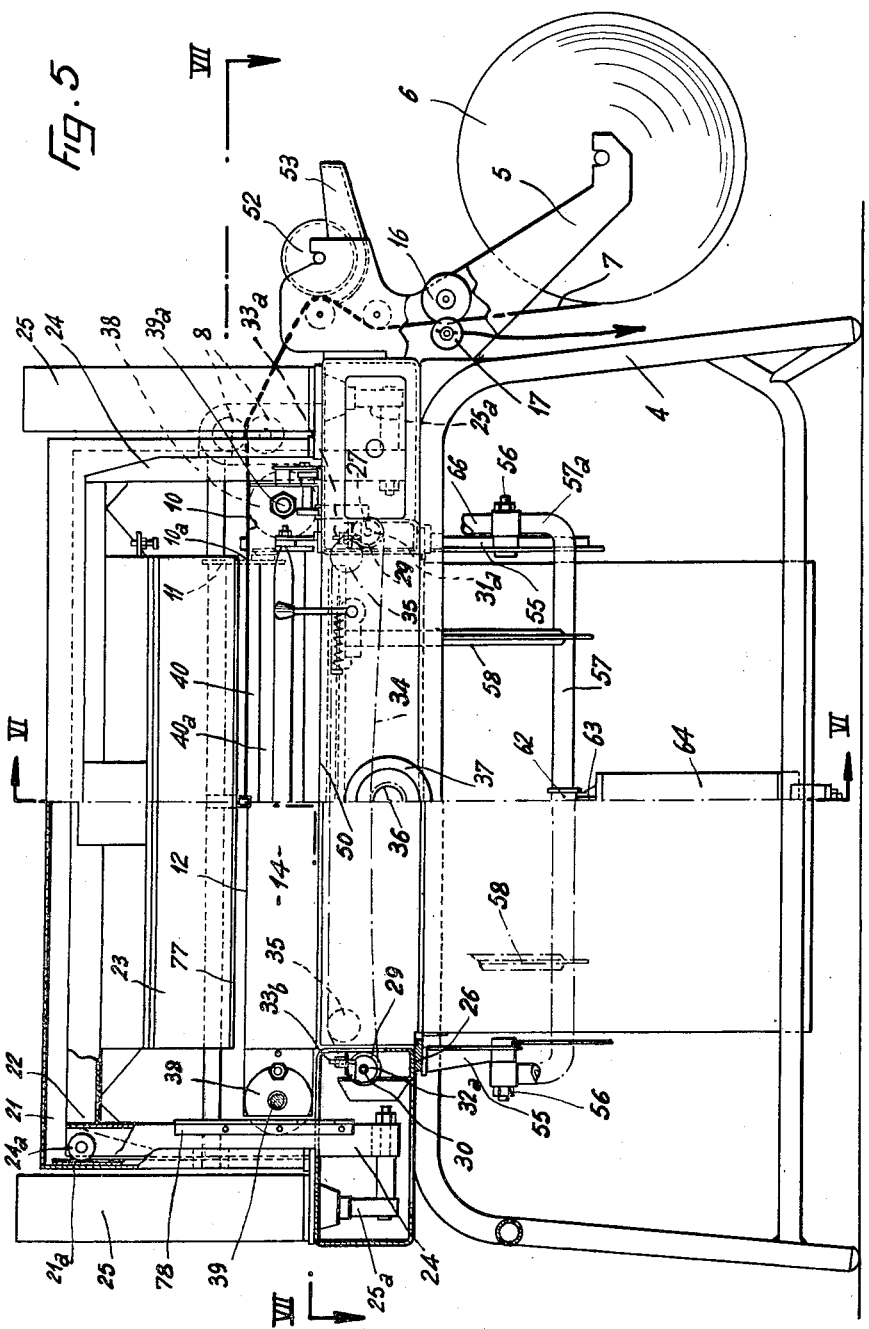

INVENTORS
Roger Henri Lallemand
René Pierre Bagon

BY Watson, Cole, Grindle & Watson
ATTORNEYS

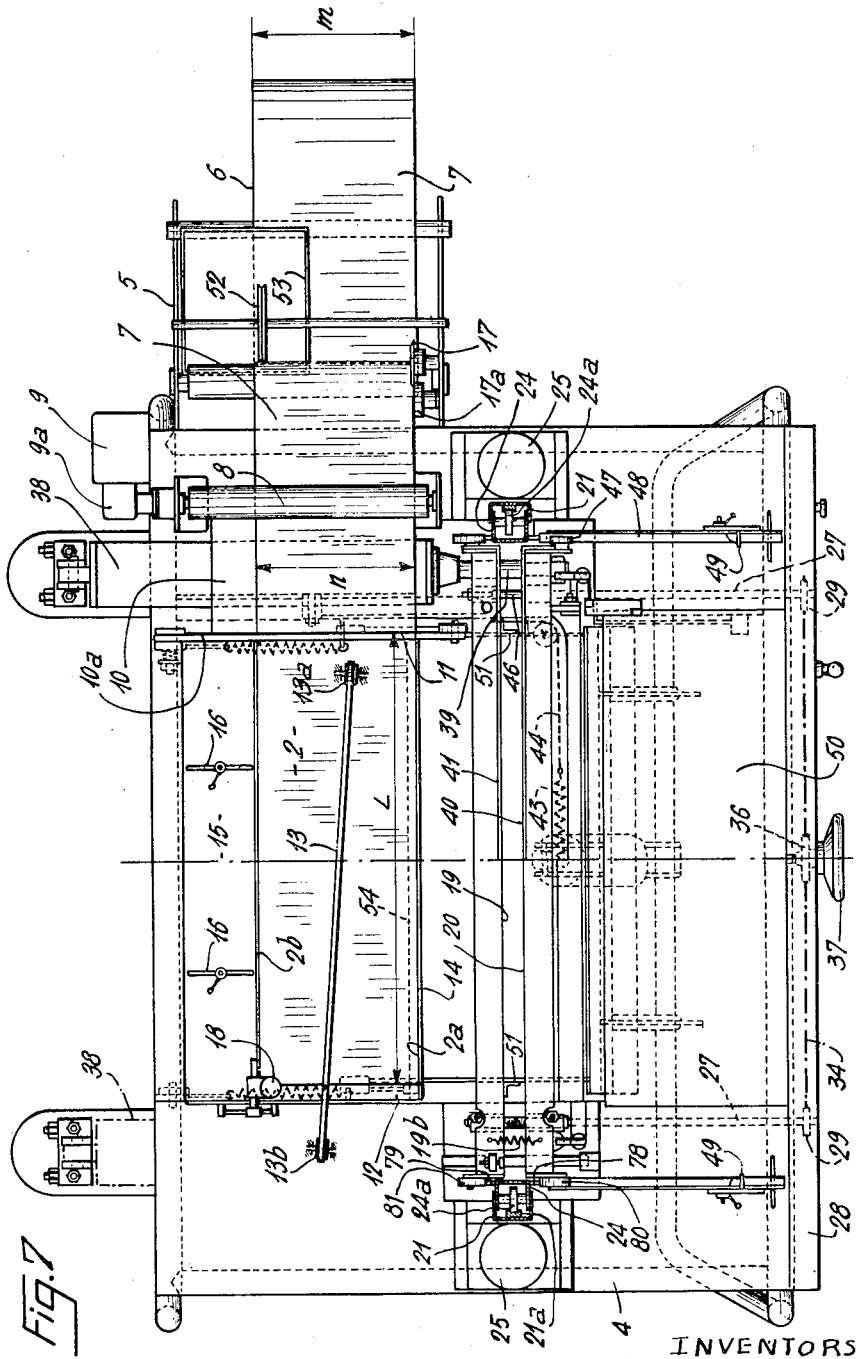

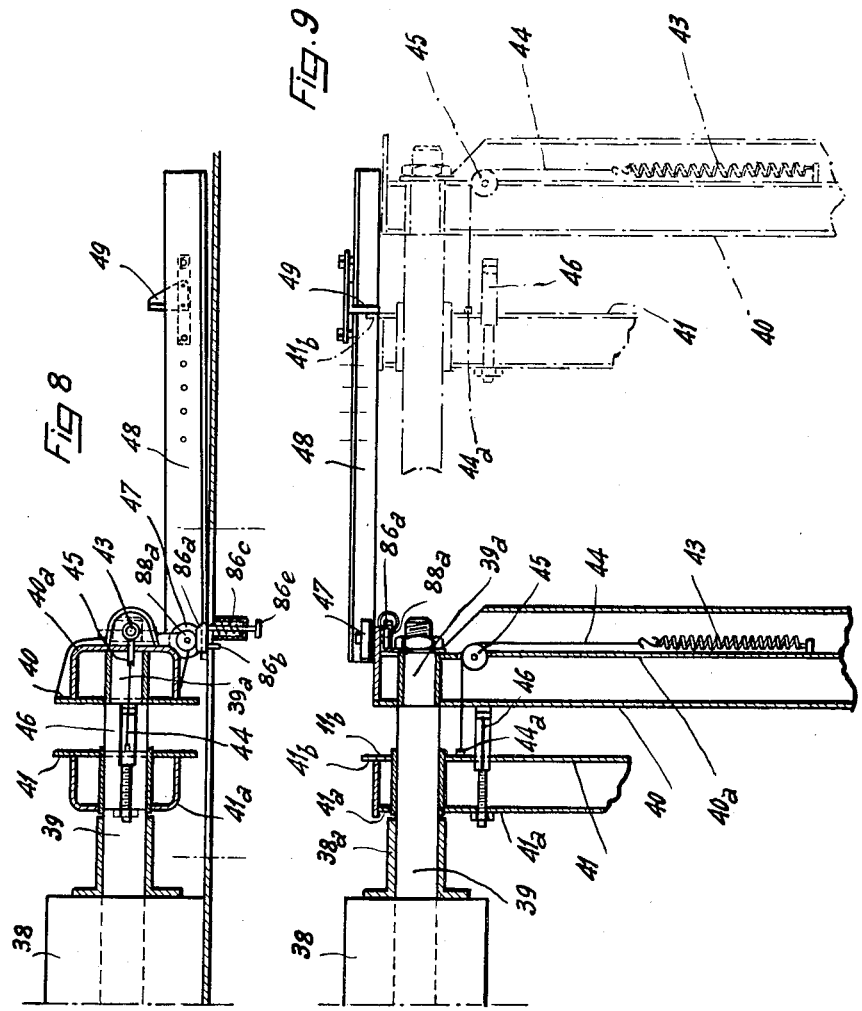

Oct. 9, 1962 R. H. LALLEMAND ETAL 3,057,134
MEANS FOR PROVIDING AN ENCIRCLING COVER STRIP
AROUND A PACK OF PAPER OR THE LIKE
Filed Sept. 29, 1960 10 Sheets-Sheet 6
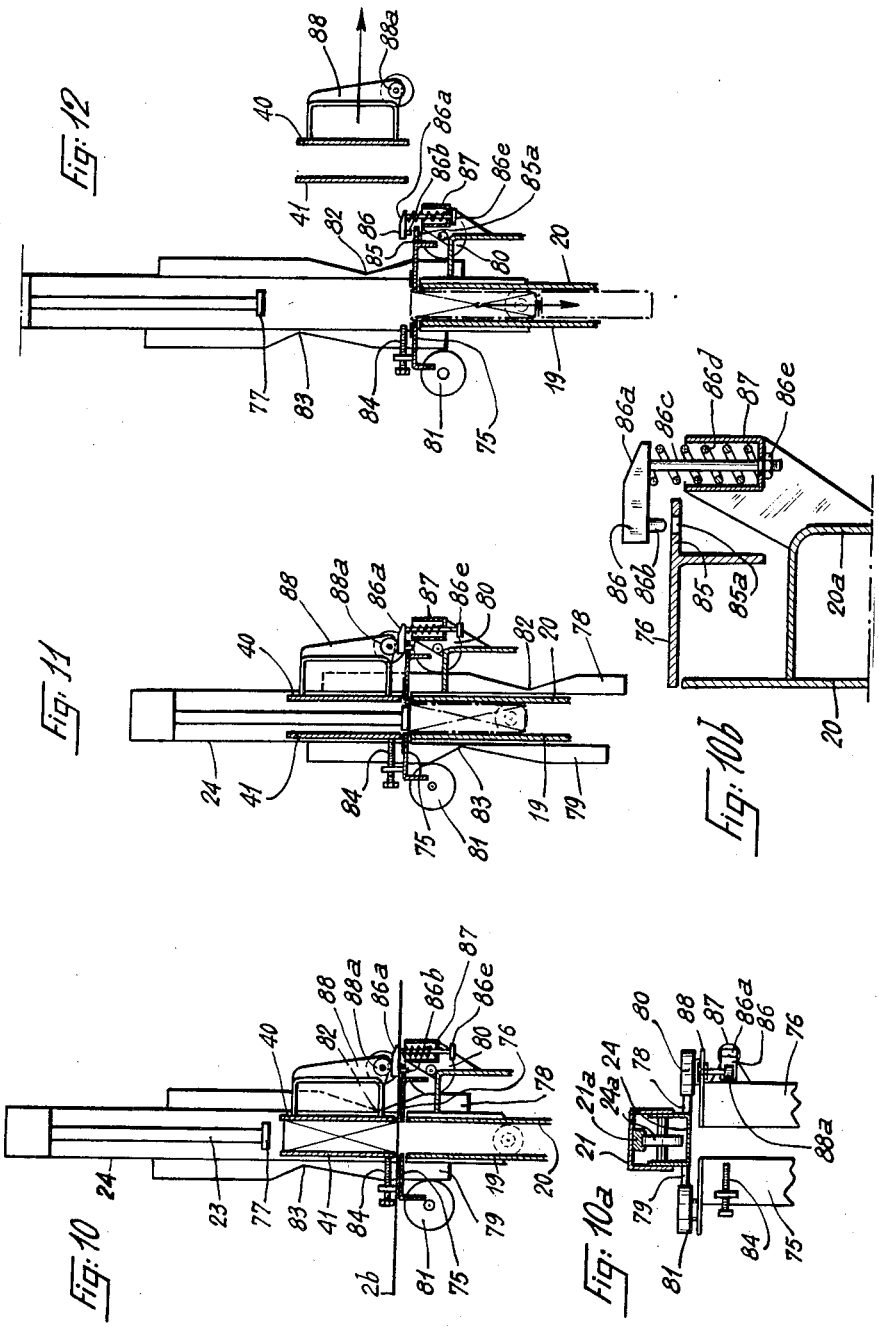
INVENTORS
Roger Henri Lallemand
René Pierre Ragon
BY Watson, Cole, Grindle & Watson
ATTORNEYS

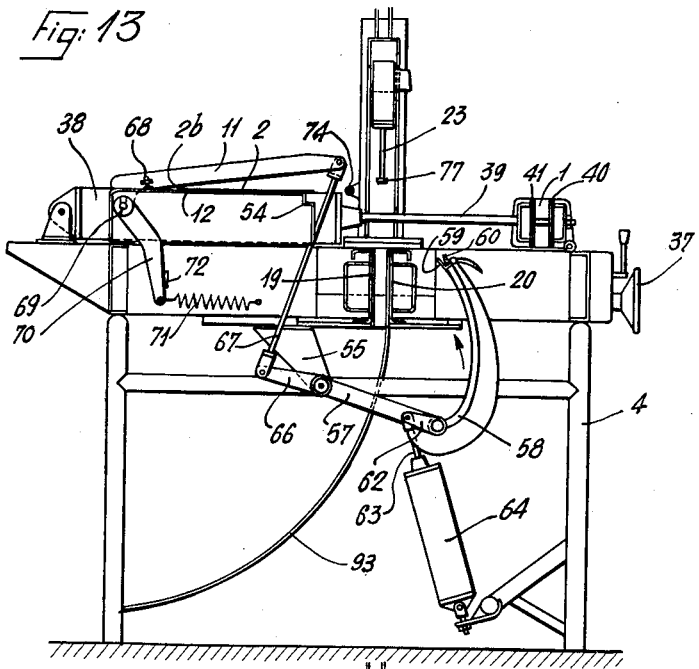
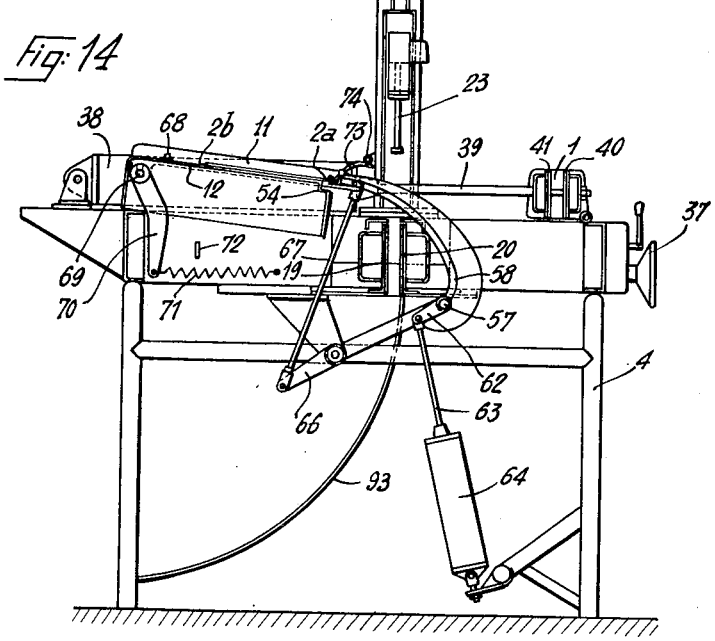

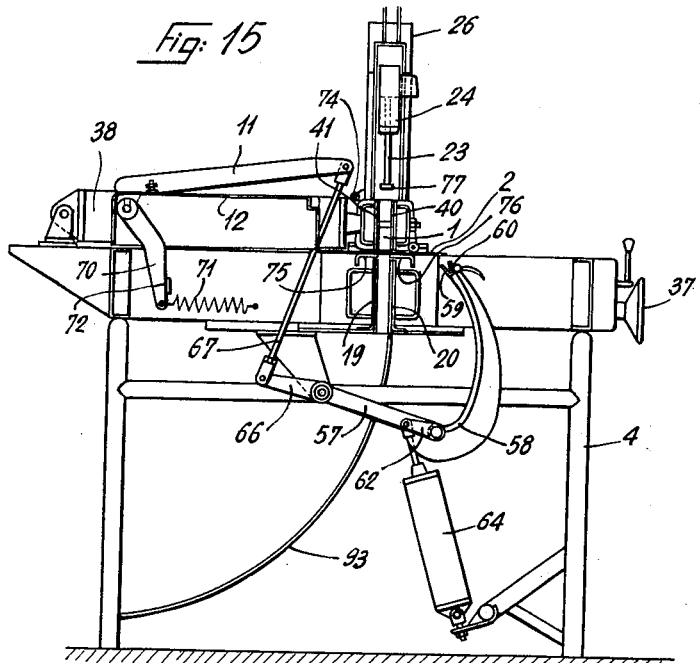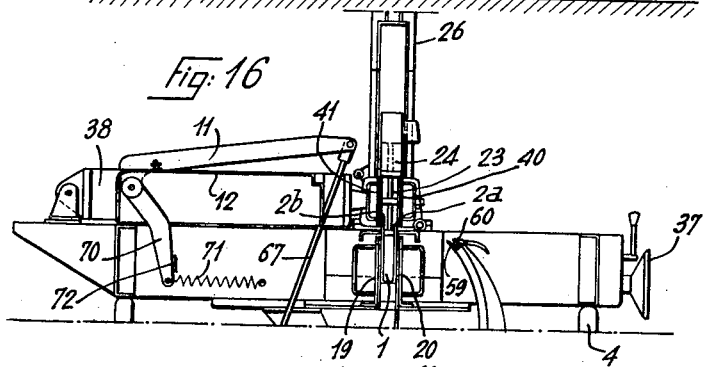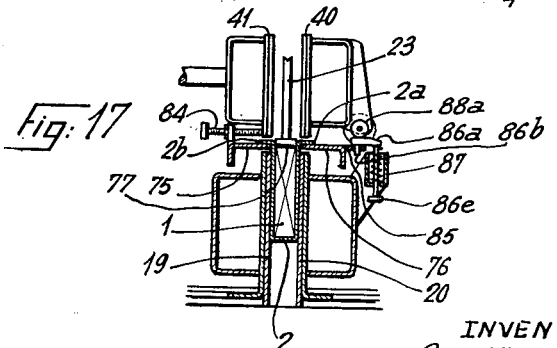

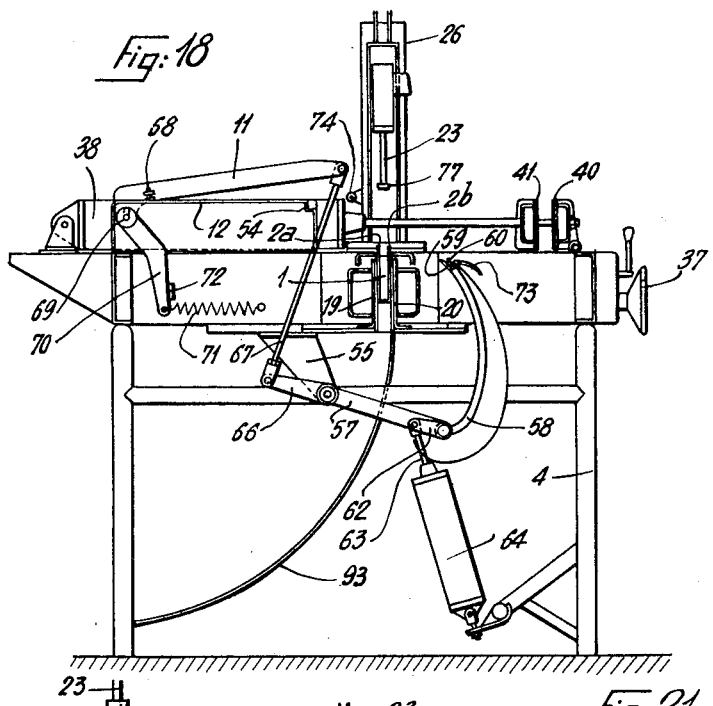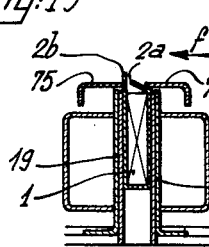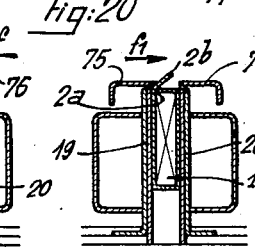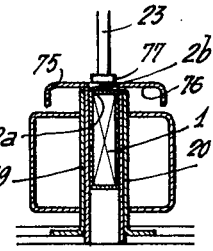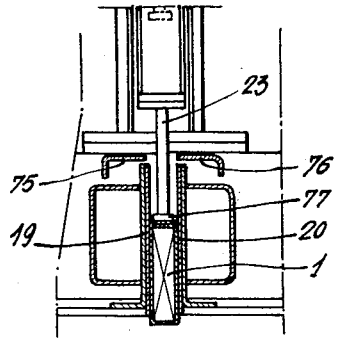

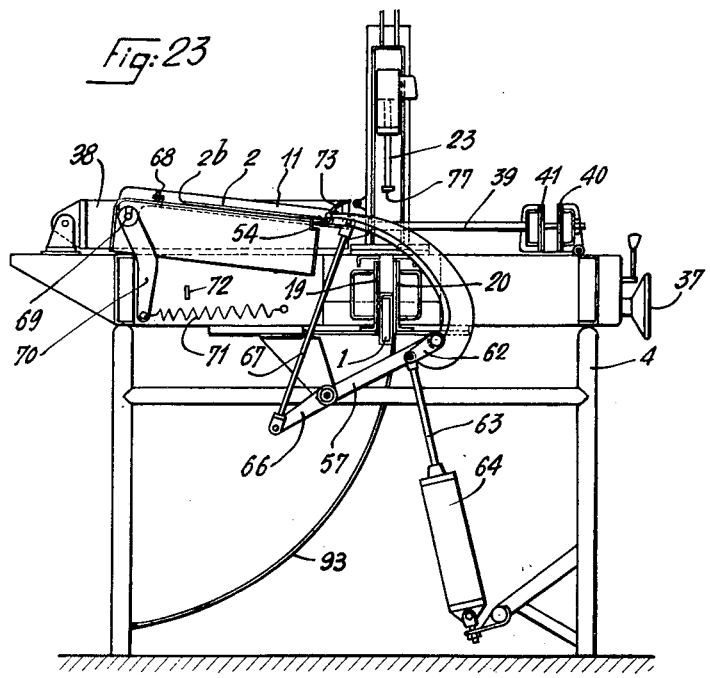
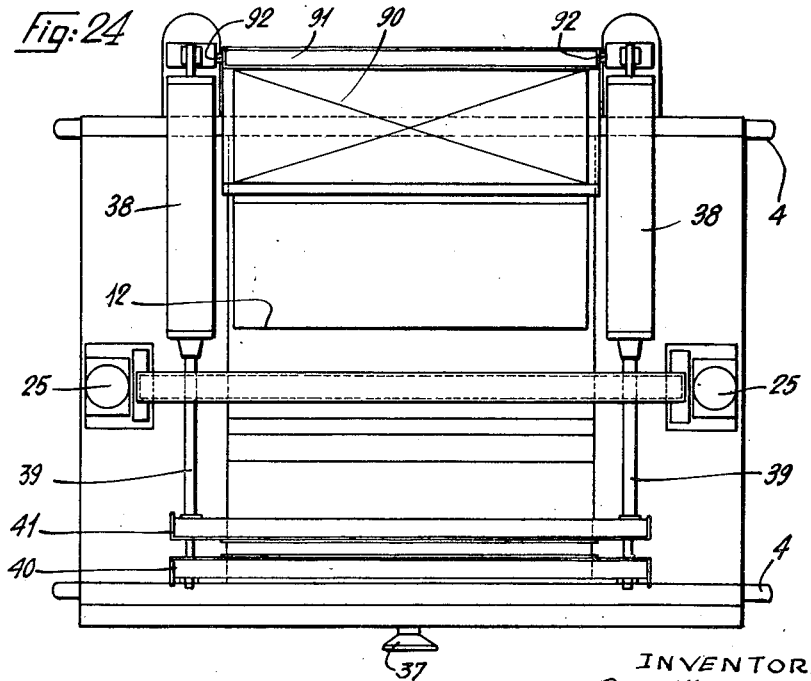

United States Patent Office 3,057,134
Patented Oct. 9, 1962

3,057,134
MEANS FOR PROVIDING AN ENCIRCLING COVER STRIP AROUND A PACK OF PAPER OR THE LIKE
Roger Henri Lallemand, Bruyeres, Vosges, and René Pierre Ragon, Laval-sur-Vologne, Vosges, France, assignors to Papeteries Mougeot, Laval-sur-Vologne, Vosges, France, a company of France
Filed Sept. 29, 1960, Ser. No. 59,248
Claims priority, application France Sept. 30, 1959
7 Claims. (Cl. 53—124)

This invention relates to machinery for providing an encircling band or cover strip around a pack of paper or a pack of other material having the comparatively compressible, yielding, character of a pack of paper of substantial thickness.

In the paper trade it is often desired to deliver packs of paper to the market covered by means of an encircling cover strip or band of stronger paper (or other flexible strip material) having overlapping ends bonded each with the other over a side surface of the pack. This need arises, for example, in the case of packs of interleaved toilet paper of the kind provided for use with conventional automatic dispensers.

The process of encircling the packs with these cover strips or bands and gluing the ends of the latter is frequently done by hand and then is extremely time-consuming. However, considerable difficulty has been experienced in the past in providing effective and reliable automatic machinery that would accomplish this simple process successfully and rapidly. One of the difficulties involved has apparently been the fact that the packs of paper must be held under a substantial degree of compression during the encircling and bonding operations and so far no satisfactory simple and yet reliable mechanism has been available for achieving this specific purpose. An object of this invention is to fill this demand.

It is, therefore, an object of this invention to provide improved means for binding packs of paper or yielding materials of comparable character by means of encircling cover bands. Objects are to provide machinery for accomplishing this function in a fully or partly automatic manner, at a fast rate, and with a high degree of reliability; and to provide such machinery which will nevertheless be comparatively simple and economical to construct, operate and maintain.

Broadly, machinery provided according to a fundamental aspect of the invention is constructed so as to be cyclically operable for performing the following repetitive sequence of operations preferably in an automatic manner: The pack of paper or other material is gripped between a pair of adjustably spaced, spring-biassed plates so as to be compressed to a predetermined thickness; the pair of plates with the compressed pack held therebetween is then transferred to a position in which it overlies and registers with a die assembly comprising a pair of vertical, parallel spaced plates defining between them a space corresponding to said predetermined thickness. Previously, a cover strip or band is placed across the tops of said die plates so that a mid-portion of the strip bridges said space; and the compressed pack when brought to the said position may have its base engaging the upper side of said midportion of the strip. A vertically reciprocable punch or plunger member is then displaced downwardly into engagement with the top of said pack so that the pack is forced down from between the two transfer plates into the space between the die plates, and in so doing the pack carries with it the cover strip which it bends so as to be partly encircled by said strip, until opposite ends of the strip protrude above the top of the pack. A pair of folder members engageable with the outer sides of said protruding ends are then displaced inwardly to fold said ends inwards in overlapping relation over the top of the pack.

An exemplary embodiment of the invention will now be described in detail, for purposes of illustration but not of limitation with reference to the accompanying drawings wherein:

FIGS. 1 to 4 are large-scale, schematic, perspective views illustrating a pack of interleaved paper sheets and the manner in which such pack may be bound, such pack constituting a typical though by no means an exclusive example of the type of pack to which the machine of the invention is applicable;

FIG. 5 is a vertical side view of the improved machine in one form of construction thereof, one half the view being an outer elevation and the other half being a vertical section on line V—V of FIG. 6;

FIG. 7 is a horizontal section on line VII—VII of FIG 5;

FIG. 8 is a detail view in vertical section illustrating one construction of the pack transfer plate assembly;

FIG. 9 is a plan view corresponding to FIG. 8;

FIGS. 10 to 12 are simplified elevational views illustrating sequential positions of the camming means controlling the inward and outward displacements of the folder flanges serving to fold the protruding ends of the cover band ends in overlapping relation;

FIG. 10a is a plan view of FIG. 10, and FIG. 10b is a vertical view showing a detail of FIG. 10 on an enlarged scale;

FIGS. 13 to 23 are simplified views generally similar to FIG. 6 but depicting sequential stages of the coverband feeding operation;

FIG. 24 is a partial overhead plan view illustrating a somewhat modified construction.

Figure 6:
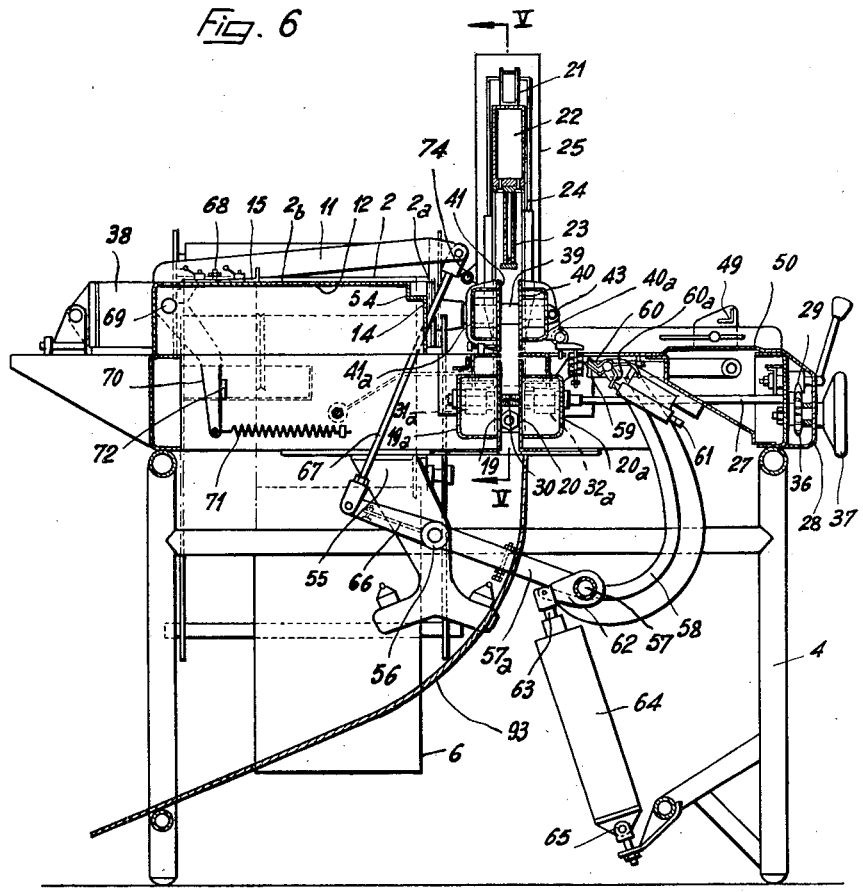
FIG. 6 is a transverse vertical cross section on line VI—VI of FIG. 5.

As shown diagrammatically in FIG. 1, a pack or sheaf of interleaved paper sheets $a1$, $a2$, $a3$, etc., is provided in the conventional form for insertion into dispensers of the type used in connection with toilet-paper for example. Each sheet is folded over so as to provide folds as at $b1$, $b2$, $b3$, with the folds of the adjacent sheets in the pack being alternately positioned along one and the opposite side of the latter. A predetermined number, say one, two or three hundred of the sheets thus interleaved form a pack and each such pack is surrounded with a cover strip of stronger paper $c$ (FIG. 2) the opposite ends of the strip being brought into overlapping relation and glue together as at $c1$. As shown in FIG. 2, the width of the cover strip $c$ is equal to the final length $l$ of the pack of sheets. However, it has already been proposed (refer to FIG. 3) to provide the sheets $a$ with an initial length L equal to an integral multiple of the final length $l$ thereof, and to surround the pack of long sheets 1 with a strip 2 having an equal width dimension L; and thereafter to cut the resulting pack into a number of segmental packs as at $t1$, $t2$, $t3$ (FIG. 4) in order to provide the packs of the desired final length $l$ similar to the pack shown in FIG. 2. This procedure obviously reduces the relative cost of the covering operation.

The invention makes use of the procedure just specified, and according to a feature of the improved method, the cover strip 2 is so disposed relative to the sheaf or pack 1 that the overlapping end portions $2a$ and $2b$ of the cover strip lie along one of the smaller side surfaces of the pack, as shown at 3. An embodiment will now be described of an improved machine for automatically covering packs of interleaved paper sheets in the manner just described. The ensuing description will refer primarily to FIGS. 5, 6 and 7.

The machine assembly includes a supporting frame or stand 4 shown by way of example as being constructed of welded tubing. Extending from one end of the frame is a bracket 5 arranged to receive thereon a roll 6 of continuous paper web 7 which is to provide the cover strip material for the individual packs. The paper web is fed out from the rotatable roll 6 by means of feed rollers 8 driven from a motor 9 through reducer gearing 9a (see FIG. 7). The web as it issues from the pair of rollers 8 slides over a stationary table 10 which carries at its end a transversely extending cutter blade 10a. Cooperating with the stationary cutter blade 10a is a movable blade 11 to constitute therewith a scissors assembly serving to cut off desired lengths of the strip 7.

Table 10 is followed by a table 12 which in a normal position forms a coplanar extension of table 10. Engaging the upper surface of table 12 is the underside of a lower leaf of an endless belt 13 mounted on spaced pulleys 13a and 13b. The belt is positioned at an angle to the forward edge 14 of table 12 as clearly shown in FIG. 7. Table 12 carries a movable abutment 15 adjustable in position relative to the table edge 14 by means of suitable slideways 16.

The width $m$ of the strip 7 stored in the roll 6 is provided somewhat greater than the width $n$ (FIG. 4) of the desired cover strip, the latter being defined by the perimeter of the pack to be covered plus the overlap. The width dimension $n$ therefore depends on the number of sheets contained in each sheaf or pack, which number may be e.g. 100, 200, etc., and moreover may vary with variations in the thickness of the sheets. In order that the width dimension $n$ shall correspond exactly to the desired dimension in each grade of paper, means are provided for trimming the strip 7 along one of its edges, such means being shown in the present construction as comprising a cutter disk 17 cooperating with an anvil or backing disk 17a. Thus the strip as fed along the table 10 can be trimmed to the desired width $n$. The adjustable stop 15 is so positioned that the edge 2a of the strip fed from the rollers 8 is substantially even or registering with the forward edge 14 of table 12.

A photoelectric cell device 18 is provided for controlling the energizing circuit of motor 9 and is arranged to cut off the circuit to stop the motor when the length of the strip fed along the surface of the table 12 agrees with the desired length L of the cover strip (FIGS. 4 and 7). When the motor is thus stopped the strip becomes stationary, and the reciprocable cutter blade 11 of the scissors is actuated in a manner to be later described so as to cut off the length of strip. The cover strip thus provided is removed from the table 12 and conveyed to the folding station as will be presently described. Removal of the cover strip causes reestablishment of the energizing circuit for motor 9 and the rollers 8 again feed a fresh length L of strip material from the roll to provide a further cover strip.

The photoelectric cell device just mentioned may be replaced with any other suitable sensing device such as a limit switch (not shown) actuated on engagement of the end of the strip with an operating element of the switch.

Beyond the table 12 the frame 4 supports a die assembly comprising a pair of horizontally spaced, transverse, vertical plates 19 and 20 (see FIG. 6) having box-shaped stiffener casings 19a and 20a secured to their outer sides. Centrally of the space between plates 19 and 20 the base frame supports an overhead frame arrangement 21 comprising guideways for a carrier structure 22 vertically reciprocable thereon. The carriage 22 has a punch or plunger 23 depending from it so as to be insertable downwardly into the space between plates 19 and 20. The movable structure includes vertical side arms 24 on which are journalled rollers 24a engaging the slideways 21a (FIGS. 5 and 7). Each of the arms 24 is connected near its bottom end to an actuator rod 25a projecting from a pressure fluid actuator cylinder 25 secured vertically on frame 4. The fluid actuators 25 are of the double-acting type and are operable to reciprocate the movable structure 22 vertically along its ways.

To enable adjustment of the spacing between die plates 19 and 20, the plates are mounted for sliding movement relative to the frame on slideways such as 26 (see FIG. 5) fixed on the frame. In this way the spacing between the die plates may be made to correspond substantially with the thickness dimension of the packs of sheets to be covered. For performing such adjustment, there are provided two similar adjusting assemblies acting on the ends of the plates 19 and 20. Each adjusting assembly comprises a shaft 27 journalled transversely of the frame and supporting on its projecting front end, within a casing 28 (FIG. 6) attached to the frame, a sprocket pinion 29 secured on said shaft. The inner end of each shaft 27 has secured to it, or formed integrally with it, an aligned screw-shaft section 30 having two screw threads 31 and 32 of reverse pitch formed thereon (FIG. 6a). Engaged on each of these screw threads is a nut 31a and 32a, and the nuts are normally prevented from rotating by the engagement with a side thereof of set screws 33a and 33b. The nuts 31a and 32a are attached to the respective casings 19a and 20a, mentioned above as being secured to the outer sides of plates 19 and 20, so as to displace the plates longitudinally in opposite directions, towards or away from each other, on rotation of the shaft 30 in either direction.

In order to ensure synchronous rotation of both shafts 27 there is provided an endless chain or other flexible element 34 (FIG. 5) trained over the sprockets 29 secured to the outer ends of the shafts 27, and over tensioning rollers 35. The lower leaf of the sprocket chain further engages with a sprocket 36 which is adapted to be driven in rotation manually from a handwheel 37 conveniently projecting from the front side of the machine.

For fine adjustment of the position of the plates 19 and 20 relative to the movable structure 22 in particular, the coupling between each shaft 27 and the related dual-pitch screw-shaft or turn-buckle 30 is effected by threaded engagement of a screw end-piece 27a of the shaft 27 into an end tapping in the shaft 30, as will be seen from FIG. 6a. A locknut 27b is provided for blocking the shaft sections 27 and 30 at a desired setting.

A pair of further pressure fluid actuators 38 are disposed horizontally along the sides of the frame 4. Each actuator rod 39 has its end 39a secured to a plate 40 forming one jaw of a clamping device and having a stiffening casing 40a secured to the rear face of said plate (see especially FIGS. 8 and 9). The other jaw of the clamping device is provided by a further plate 41 which is centrally apertured so as to be slidable along the rod 39 and is similarly provided wtih a stiffener casing 41a. Plate 41 is urged towards plate 40 by springs 43 having their one ends attached to wires 44 trained over return pulleys 45 carried by the casing 40a, and having their free ends anchored at 44a to the other plate 41. Adjustable stops 46 carried by plate 41 limit the displacement of said plate towards plate 40.

Figure 6A:
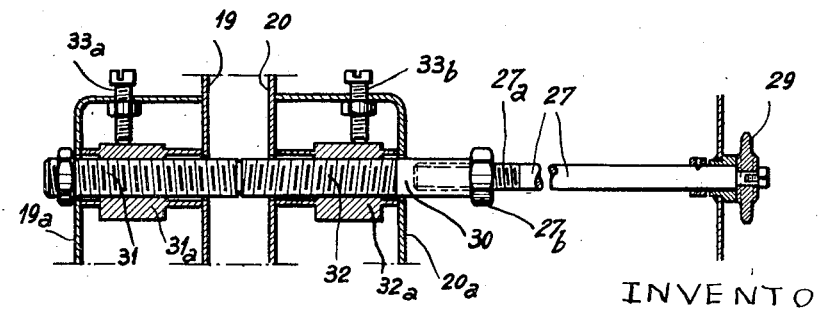
FIG. 6a shows a detail of FIG. 6 drawn to an enlarged scale.

Thus the double-acting actuators 38 may be operated to displace the jaw assemblies bodily between the position shown in FIG. 6 in which they are substantially coaxial with the die plates 19 and 20, and a position adjacent to the front end of the machine as indicated in chain lines in FIG. 9. To prevent a condition from arising in which the actuator rods 39 would be unsupported in fully extended condition and thus be subjected to excessive bending strain, rollers 47 are provided journalled on the clamp member 40 and riding along runways 48 carried by the frame 4.

The clamp member 41 is somewhat longer than is the member 40 so that the member 41 projects at both ends laterally beyond alignment with the corresponding ends of member 40, as indicated at 41b in FIG. 9.

Secured to frame 4 is a stop 49 positioned adjacent the path followed by the projecting part 41b. The stop 49 is adjustable in its position. On considering the clamp members 40 and 41 in that position in which they are coaxial with the die assembly (see FIG. 7) it will readily be appreciated that, as said clamp members are displaced from such position forwardly of the machine, member 41 will at a certain point of its displacement engage the stop 49 and will thereupon be blocked, whereas clamp member 40 which is positively driven by the actuator rods 39, will continue its displacement and thus move away from member 41 to assume with respect thereto a wider spacing than originally. The clamp member 40 is eventually blocked at a position near the front end of the machine as the piston rods 39 reach their outermost positions, as shown in chain lines in FIG. 9.

It is in this final position reached by the clamp members 40 and 41 that the pack of paper 1 to be covered is inserted between the members 40 and 41. The pack rests with its bottom edge surface resting upon the stationary table 50 carried by the frame, with both side faces of the pack registering with plates 40 and 41. One or two stops such as 51 disposed towards the ends of the plates 40 and 41 serve to locate the pack in longitudinal position with respect to said plates (see FIG. 7). As the plates 40 and 41 start on their return displacement towards the position registering with the die assembly, the plate 40 is brought closer to the plate 41 which is held against the stops 49 and thereby acts to compress the pack 1 through the springs 43. Thereafter the whole assembly including plate 40, pack 1 and plate 41 is bodily moved towards the central die assembly with the pack 1 being resiliently held between the plates 40 and 41. Towards the end of this bodily movement the plate 41 with its casing 41a is blocked owing to its engagement with a stop 38a provided on the cylinder of each of the related actuators 38. Thereafter, the plate 40 since it is still being displaced by the actuators 38 compresses the pack 1 to the extent permitted by the engagement of plate 40 against the stops 46.

As previously described, the strips were cut off to length from a continuous strip or web 7 after the latter was first trimmed along one of its long edges to determine the width dimension n of the cover strip, whereas the length L of the cover strip is determined by the instant at which the cutter member 11 is operated in response to the photoelectric or other senser. The resulting cover strip is coated with adhesive along one of its margins 2b by the action of a coating disk 52 formed with an annular groove extending along an intermediate portion of its periphery, said disk being supported and rotated within a tank 53 containing a store of adhesive composition.

The endless belt 13 serves to hold the coated margin 2b of the cover strip applied against the stop 15 and, in this position, the front margin 2a of the strip projects beyond an indented portion 54 of the front end of table 12 (see FIGS. 6 and 13).

Secured on the frame 4 are two supports 55 (see FIGS. 5 and 6) from which project journals 56 on which are pivoted the arms of a yoke 57 secured to a pair of arms 58. On the opposite ends of the arms is attached a stationary clamp member 59 cooperating with a movable clamp member to provide a clamping device serving to transfer the cover strip from the table 12 to a ready position overlying the die assembly. The movable clamp member 60 is urged against the stationary clamp member 59 by a spring arrangement, and the opening of said movable clamp member 60 is obtained by means of a screw 61 carried by the frame 4 and constituting an abutment for an extension 60a of the said clamp member. Secured to a middle brnach of yoke 57 is a small lever 62 which is pivoted to one end of an actuator rod 63 projecting from an actuator cylinder 64 pivoted at 65 to an extension of the frame 4. The branch 57a of yoke 57 is attached to an extension lever 66 having its free end pivoted to a connecting link 67 the other end of which is pivoted to an end of the movable cutter blade 11. Cutter blade 11 is provided with an adjustable stop 68 adapted, on downward movement of the blade, to engage the upper surface of table 12. The table 12 has its rear end pivoted on a pivot shaft 69 to the frame. Mounted on the pivot shaft 69 are a pair of parallel-spaced levers 70 which are bodily movable with the table in its angular displacements and are urged by springs 71 towards engagement with stops 72 on the frame, so positioned that the table 12 in its normal position thus defined is coplanar with the stationary table 10.

With the various components described above in the positions shown in FIGS. 6 and 13, admission of pressure fluid into the actuator cylinder 64 will cause the yoke 57 to rock to the position shown in FIG. 14. This rocking movement of yoke 57 has the following effects: Cutter blade 11 is lowered to cut off a length of paper strip; table 12 is rocked by the cutter blade 11; and the transfer clamp 59 is moved to a position near the front end of table 12, in the recessed portion 54 thereof. Towards the end of the displacement the movable member of the clamp is moved away from the stationary clamp member owing to engagement of the extension 73 of said movable member with a roller 74 journalled on the machine frame. The clamp jaws are thus able to assume a position in which they surround the front end 2a of the cover strip 2, and are thereafter moved inwards into clamping engagement with said front end on the actuator 64 being operated to retract the actuator rod 63. This clamping movement occurs because the extension 73 of the movable clamp jaw disengages the roller 74, whereupon said movable jaw is resiliently applied against the stationary jaw; the cover strip is thus carried with the transfer clamp as the latter recedes, until the extension 60a strikes the abutment screw 61 (FIG. 6). Simultaneously, the cutter blade 11 and the table 12 under the action of springs 71 are returned to their initial position shown in FIGS. 13 and 15, while the cover strip is laid down flat over the die assembly. The length of displacement of the transfer clamp is so predetermined that the longitudinal midline of the cover strip 2 registers with the longitudinal midline of the die assembly.

During the receding movement of the transfer clamp, the actuators 28 are operated in the direction to retract the rods 39, and both movements are so correlated that the jaws 40 and 41, at the end of the displacement of the transfer clamp, have returned the pack of paper 1 held therebetween into a position in coaxial register with the die as indicated in FIG. 15. In this position the bottom end surface of pack 1 lies immediately adjacent the upper surface of cover strip 2.

The plates 19 and 20 which comprise the die assembly as described above, have associated therewith a pair of horizontal flanges 75 and 76 which are slidably mounted for movement towards and away from each other. In the normal or idle position the inner edges of said flanges are in vertical alignment with the inner surfaces of plates 19 and 20. The flanges 75 and 76 serve as supports for the cover strip 2 in the area adjacent the die plates 19 and 20.

With the machine components in the position shown in FIG. 15 the actuators 26 are operated to expand the rods 25 downwardly and thereby move the movable structure 24 downwards along its guideways on upper frame 21. As indicated, the movable structure 24 includes a depending punch 23 carrying at its lower end a horizontal flange or shoe 77 substantially equal in width to the thickness of the pack 1 clamped between the jaws 40 and 41. The shoe 77 in its downward movement (see FIG. 17) is applied against the top surface of the pack and moves it downward, and the pack in turn carries with it the cover strip 2 which thereby assumes a U-shaped configuration as it slides in soft frictional engagement with the die plates 19 and 20, and is brought into engagement with the under end surface of the pack and both side faces of it (see FIGS. 16 and 18). The downward displacement of shoe 77 is such that the upper end surface of the pack is moved to a position somewhat below the horizontal level of the upper edge of plates 19 and 20. Hence the margins 2a and 2b of the cover strip are positioned flat over the flanges 75 and 76 (FIG. 17).

The application of pressure fluid to the actuators 26 is now reversed so that the movable structure rises to return to the position shown in FIG. 15. As the flange 77 reaches a position overlying the upper edges of jaws 40 and 41, the actuators 38 are operated and said jaws, from which the pack 1 has now been removed, are returned towards the front end of the machine as shown in FIG. 18. As soon as the jaws have been moved away from the die, the margins 2a and 2b of the cover strip are raised to substantially higher level. The actuator rods 26 are now once again operated to lower the punch plunger 23. During this further descent of the punch, a mechanism to be presently described imparts the following operating cycle to the flanges 75 and 76: First the flange 76 is displaced in the direction shown by arrow $f$ (FIG. 19), thereby folding down the projecting portion of the cover strip terminating at margin 2a against the upper end surface of pack 1, then the flange 75 in turn is actuated in the direction $f_1$ (FIG. 20) and this movement folds down the projecting flap terminating at margin 2b against the margin 2a. The punch 23 as it continues on its downward stroke applies the flange 77 against the flap 2b (FIG. 2). The adhesive coating on this flap 2b bonds it to the other flap. Preferably the setting of the adhesive is activated by the application of heat through the flange 77, as by the provision of electric heating resistors within the punch 23. As the punch 23 proceeds on its downward stroke, the pack 1 surrounded by its cover strip is moved to the bottom outlet end of the die assembly (FIG. 22). The application of pressure fluid to actuators 26 is then reversed to return the punch to its initial upper position (FIG. 23). The operating cycle is thus completed.

A fresh pack of interleaved sheets is then inserted between the clamping jaws 40 and 41 as described above and a new cycle commences. As this fresh pack becomes inserted into the die assembly in the manner previously explained, and the punch 23 is moved downwards, this will act to expel the covered pack produced in the preceding cycle for discharge by way of a chute 93 towards a discharge conveyor or other receiving means.

As described earlier, the edges of the cover strip are folded down over each other by the action of flanges 75 and 76. In one form of embodiment of the invention, the necessary movement of the flanges is derived from the operation of punch 23; it should be noticed however that the punch 23 actually performs two downward strokes per cycle. One stroke serves to insert the pack and cover strip into the die, and a second stroke acts to press the overlapping ends of the strip against each other and force the covered pack into the lower part of the die. Only this second stroke of the punch is used to operate the flanges 75 and 76. In other words during the first stroke of the punch the said flanges must remain stationary. For this purpose any of various means may be provided for blocking the flanges and then releasing them and cause their actuation from the punch on its second downward stroke. One suitable mechanism for this purpose will be described.

Means for controlling the bodily displacement of the flanges will now first be disclosed. Secured to each of the vertical arms 24 of the movable structure, on the front and rear sides of said arms, are camways 78 and 79 respectively (see especially FIGS. 7 and 10–12). Resiliently engaging the camways are rollers 80 and 81 respectively which are journalled on the flanges 76 and 75. The camway 78 has a recess 82 in it which is displaced vertically with respect to a corresponding recess 83 in camway 79, recess 82 being positioned at a lower level than that of recess 83. With this arrangement it will be understood that, as the movable carrier is displaced downwards, the recess 82 as it moves adjacent roller 80 will permit the flange 76 to move towards the longitudinal midline of the space defined between plates 19 and 20, by the action of return springs 19b (FIG. 7) and such movement will act to fold the end part of the cover strip adjacent margin 2a, as illustrated in FIG. 19. As the movable structure proceeds on its downward movement, the roller 80 is moved away and flange 76 is restored to its original position. On the other hand roller 81 as it engages recess 83 causes displacement of flange 75 and folds the opposite end of the strip near margin 2b, as illustrated in FIG. 20. At the end of the upward movement of the movable structure the rollers are blocked by camways 78 and 79 in such a position that the flanges 75 and 76 are spaced apart from one another and are in their idle normal position.

To prevent the flanges 76 and 75 from effecting their above-indicated displacements during the first downward stroke of punch 23, since the transfer jaws 40 and 41 are at this time overlying the die as shown in FIG. 17, provision is made for taking advantage of the presence of the jaws 40 and 41 in this position at that time in order to block the flanges 75 and 76. For this purpose the flange 75 carries a stop screw 84 having its end in engagement with a sheet 41 so that any displacement of flange 75 toward the midline of the die is prevented (see FIGS. 10 and 11). The flange 76 is provided with a lug 85 (see FIGS. 6, 10 to 12, and 17) near at least one of its ends and having a hole 85a in it. Over the lug is positioned a shoe 86 having one end formed as a cam 86a and further carrying a depending finger 86b at one end overlying hole 85 and a depending shank 86c at its other end. A coil spring 86d surrounding the shank 86a has one end abutted against the under surface of the shoe 86 and its bottom end seated in the end wall of a casing 87 secured to the assembly 20—20a. The spring 86d tends to move shoe 86 away from the upper surface of lug 85, and a nut 86e adjustably limits the movement of the shoe. The jaw member 40 with its casing 40a is provided at one end at least with a terminal flange 89 carrying a roller 88a. So long as the transfer jaws are positioned adjacent the die, the flanges 75 and 76 are blocked, flange 75 being blocked by the action of screw 84 and flange 76 by engagement of finger 86b in hole 85a as the shoe 86 is depressed by the camming action of roller 88a. When however the transfer jaws are moved away from the die, which occurs before the second downward stroke of punch 23, the flanges 75 and 76 are released and are permitted to be moved towards each other as the punch 23 descends. It will be understood that the latching mechanism just described might be replaced by any other suitable latching mechanism.

As indicated earlier, the machine described provides for the handling of packs of different thicknesses as may be determined by the number of sheets in each pack. And for this purpose means have been described above for adjusting the spacing between the jaws 19 and 20 of the die members by manual action on the handwheel 37. Similarly, it was stataed that by acting on stop screw 46 the spacing between jaws 40 and 41 can be adjusted. Desirably in making such adjustment appropriate length gauges may be used, corresponding to the desired thickness of a pack having the desired number of sheets. It will be understood that the punch flange 77 is replaceably mounted on punch 23 so permit matching between the punch flange used and the desired pack thickness. Further, the displacements of flanges 75 and 76 have to be adjusted in dependency on the pack thickness. For this purpose, the rollers 80 and 81 may be made replaceable to match the diameter of the rollers used with the desired pack thickness.

The width $n$ of the cover strip is determined by the width of the strip 7 fed to the machine, as corrected by the trimmer disk 16. The position of the strip on the table 12 is adjusted by displacement of the movable stop 15, the position of which latter is determined by the fact that the longitudinal midline of the strip must register with the midline of the die; and this adjustment may be completed by acting on the position of the pivot point at which actuator cylinder 64 is pivoted to the frame 4, since the actuator 64 controls the displacements of the transfer clamp including the jaws 59 and 60.

If it is desired that the machine shall be capable of handling packs of different lengths, (each modular length being a multiple of the length of each final pack of paper), then it would simply be necessary to alter the position of the photoelectric cell 18 or other senser device used, such as a limit switch for example, and thereby to alter the length of the strip cut off by shears 11; at the same time the stops 51 provided between the plates 19 and 20 of the die assembly should be correspondingly adjusted.

The five pressure fluid actuators used in the illustrated embodiment of the invention, viz. the pair of actuators 26, the pair 38 and the actuator 64, are preferably air-operated. The pneumatic circuitry therefor may include valving of conventional type automatically operable by the movable components of the machine so as to operate the actuators in the requisite sequence and timing. Adjustable delay devices, also of conventional type, may be inserted at requisite points. All of the above mentioned features are well-known in the art of automatic pneumatic control and need not be gone into in detail.

Automatic temperature control means including conventional thermostat adjustment are preferably provided for controlling the temperature of heating punch flange 77.

In the embodiment of the machine described, the cover strips are cut to length from a continuous strip or web stored in the form of a roll. In a modified construction according to the invention, it is contemplated that the machine is fed with cover strips that have preliminary been cut to the requisite dimensions L and $n$ in length and width respectively; in such case the strips may be stored in stacked condition near the rear end of the machine, as indicated at 90 in FIG. 24.

Referring to this latter FIGURE, a tank containing adhesive 91 extending throughout the length of the strips is applied over the stack of strips so as to deposit a coat of adhesive over a marginal segment along the rear end of the uppermost strip of the stack (corresponding to the margin 2b in the cover strips of the first described embodiment). The cover strips are picked up in succession from the top of the stack and delivered to a point near the front end of the table 12 by any suitable feeding and registering device. The adhesive tank 91 is guided by a pair of vertical rods 92 positioned at each end of the tank so that the tank is brought into contact with the upper face of each successive strip as the strip overlying it is picked off.

Various modifications other than those mentioned may of course be introduced into the machine as illustrated and described herein within the scope of the invention. It will be apparent moreover that while the invention has been described with explicit reference to the provision of cover strips around packs of interleaved paper sheets, it would be equally applicable, with only minor changes if any, to cases where it is desired to provide a strip or band of paper or other sheet material around packs or blocks of any materials having similar yielding or compressible characteristics and requiring to be maintained in a compressed condition during their packaging.

What we claim is:

1. In a machine for cyclically binding a series of packs of compressible material with encircling flexible coverbands in combination: a table adapted to support a said pack on a flat, rigid surface, a transfer assembly comprising a pair of parallel spaced plates adapted to receive a pack therebetween and adjustable spring means biassing said plates inwards to compress the pack while supported on said surface to a predetermined thickness; a die assembly comprising a pair of vertical parallel spaced plates and means for adjusting the spacing between said plates to said predetermined thickness; means cyclically operable to place a cover band across the tops of said die plates; means cyclically operable for bodily displacing said transfer assembly with a pack therein to a position in overlying, aligned registering relation with said die assembly and with the bottom of the pack overlying said band; a generally vertically reciprocable punch engageable with the top of said pack and means cyclically operable for downwardly reciprocating said punch to force the pack down out of the transfer assembly into the die assembly whereby the pack carries with it and bends the cover band to a condition wherein said band partly encircles the pack and the opposite ends of the band protrude above the top of the pack; generally horizontally reciprocable folder means engageable with the outer sides of the protruding band ends, and means cyclically operable to reciprocate said folder means inwardly to fold said band ends in over the top end of the pack in overlapping relation, including means cyclically operable for bonding said overlapping ends; and power actuator means operative according to a predetermined timed schedule for operating all of said cyclically operable means, reel means for storing said cover bands in the form of a roll of a continuous web of strip material; means for feeding out said web from said reel, cutter means for cutting off predetermined lengths of said web to provide said cover bands; and means for placing the resulting cover bands across the tops of said die plates; further cutter means for trimming said web along one longitudinal side edge thereof as it is fed by said feeding means for imparting a predetermined width to said cover bands.

2. In a machine for cyclically binding a series of packs of compressible material with encircling flexible coverbands in combination: a table adapted to support a said pack on a flat, rigid surface, a transfer assembly comprising a pair of parallel spaced plates adapted to receive a pack therebetween and adjustable spring means biassing said plates inwards to compress the pack while supported on said surface to a predetermined thickness; a die assembly comprising a pair of vertical parallel spaced plates and means for adjusting the spacing between said plates to said predetermined thickness; means cyclically operable to place a cover band across the tops of said die plates; means cyclically operable for bodily displacing said transfer assembly with a pack therein to a position in overlying, aligned registering relation with said die assembly and with the bottom of the pack overlying said band; a generally vertically reciprocable punch engageable with the top of said pack and means cyclically operable for downwardly reciprocating said punch to force the pack down out of the transfer assembly into the die assembly whereby the pack carries with it and bends the cover band to a condition wherein said band partly encircles the pack and the opposite ends of the band protrude above the top of the pack; generally horizontally reciprocable folder means engageable with the outer sides of the protruding band ends, and means cyclically operable to reciprocate said folder means inwardly to fold said band ends in over the top end of the pack in overlapping relation, including means cyclically operable for bonding said overlapping ends; and power actuator means operative according to a predetermined timed schedule for operating all of said cyclically operable means, said power actuator means including a pressure-fluid actuator having a generally horizontally expansible actuator element, and said transfer assembly comprising a first plate secured to said actuator element and a second plate in parallel space relation with the first plate and supported on said actuator element for sliding displacement towards and away said first plate spring means biassing said second plate towards said first plate, and adjustable stop means on said actuator element for limiting said biassing movement.

3. The machine claimed in claim 2, wherein said second plate includes a side portion projecting beyond said first plate, and adjustable stop means on the fixed frame of said machine engageable with said projecting portion for arresting said second plate at a prescribed point and thereby moving said first plate away from said second plate.

4. In a machine for cyclically binding a series of packs of compressible material with encircling flexible coverbands in combination: a table adapted to support a said pack on a flat, rigid surface, a transfer assembly comprising a pair of parallel spaced plates adapted to receive a pack therebetween and adjustable spring means biassing said plates inwards to compress the pack while supported on said surface to a predetermined thickness; a die assembly comprising a pair of vertical parallel spaced plates and means for adjusting the spacing between said plates to said predetermined thickness; means cyclically operable to place a cover band across the tops of said die plates; means cyclically operable for bodily displacing said transfer assembly with a pack therein to a position in overlying, aligned registering relation with said die assembly and with the bottom of the pack overlying said band; a generally vertically reciprocable punch engageable with the top of said pack and means cyclically operable for downwardly reciprocating said punch to force the pack down out of the transfer assembly into the die assembly whereby the pack carries with it and bends the cover band to a condition wherein said band partly encircles the pack and the opposite ends of the band protrude above the top of the pack; generally horizontally reciprocable folder means engageable with the outer sides of the protruding band ends, and means cyclically operable to reciprocate said folder means inwardly to fold said band ends in over the top end of the pack in overlapping relation, including means cyclically operable for bonding said overlapping ends; and power actuator means operative according to a predetermined timed schedule for operating all of said cyclically operable means, said means for adjusting the spacing between said die plates comprising aligned nut members secured to the respective plates, a screw shaft having threaded shaft sections of opposite screw pitch respectively engaging said nut members; and means for rotating said screw shaft.

5. In a machine for cyclically binding a series of packs of compressible material with encircling flexible coverbands in combination: a table adapted to support a said pack on a flat, rigid surface, a transfer assembly comprising a pair of parallel spaced plates adapted to receive a pack therebetween and adjustable spring means biassing said plates inwards to compress the pack while supported on said surface to a predetermined thickness; a die assembly comprising a pair of vertical parallel spaced plates and means for adjusting the spacing between said plates to said predetermined thickness; means cyclically operable to place a cover band across the tops of said die plates; means cyclically operable for bodily displacing said transfer assembly with a pack therein to a position in overlying, aligned registering relation with said die assembly and with the bottom of the pack overlying said band; a generally vertically reciprocable punch engageable with the top of said pack and means cyclically operable for downwardly reciprocating said punch to force the pack down out of the transfer assembly into the die assembly whereby the pack carries with it and bends the cover band to a condition wherein said band partly encircles the pack and the opposite ends of the band protrude above the top of the pack; generally horizontally reciprocable folder means engageable with the outer sides of the protruding band ends, and means cyclically operable to reciprocate said folder means inwardly to fold said band ends in over the top end of the pack in overlapping relation, including means cyclically operable for bonding said overlapping ends; and power actuator means operative according to a predetermined timed schedule for operating all of said cyclically operable means, camming means for sequentially reciprocating first one then the other of said folder means inwardly to fold the band ends in overlapping relation, means operatively connecting said camming means with said punch member for camming the folder means on downward reciprocation of said member, and resilient latching means preventing such camming action during that period of a machine cycle when said transfer assembly is overlying said die assembly.

6. In a machine for cyclically binding a series of packs of compressible material with encircling flexible coverbands in combination: a table adapted to support a said pack on a flat, rigid surface, a transfer assembly comprising a pair of parallel spaced plates adapted to receive a pack therebetween and adjustable spring means biassing said plates inwards to compress the pack while supported on said surface to a predetermined thickness; a die assembly comprising a pair of vertical parallel spaced plates and means for adjusting the spacing between said plates to said predetermined thickness; means cyclically operable to place a cover band across the tops of said die plates; means cyclically operable for bodily displacing said transfer assembly with a pack therein to a position in overlying, aligned registering relation with said die assembly and with the bottom of the pack overlying said band; a generally vertically reciprocable punch engageable with the top of said pack and means cyclically operable for downwardly reciprocating said punch to force the pack down out of the transfer assembly into the die assembly whereby the pack carries with it and bends the cover band to a condition wherein said band partly encircles the pack and the opposite ends of the band protrude above the top of the pack; generally horizontally reciprocable folder means engageable with the outer sides of the protruding band ends, and means cyclically operable to reciprocate said folder means inwardly to fold said band ends in over the top end of the pack in overlapping relation, including means cyclically operable for bonding said overlapping ends; and power actuator means operative according to a predetermined timed schedule for operating all of said cyclically operable means, a rocker arm pivoted on the machine frame, gripper means on said arm engageable with a front end of a cover band, and cyclically operative means for rocking said arm and engaging and disengaging said gripper means with and from a cover band to bring said cover bands to positions overlying said die plates and placing said bands across the tops of said die plates.

7. In a machine for cyclically binding a series of packs of compressible material with encircling flexible coverbands in combination: a table adapted to support a said pack on a flat, rigid surface, a transfer assembly comprising a pair of parallel spaced plates adapted to receive a pack therebetween and adjustable spring means biassing said plates inwards to compress the pack while supported on said surface to a predetermined thickness; a die assembly comprising a pair of vertical parallel spaced plates and means for adjusting the spacing between said plates to said predetermined thickness; means cyclically operable to place a cover band across the tops of said die plates; means cyclically operable for bodily displacing said transfer assembly with a pack therein to a position in overlying, aligned registering relation with said die assembly and with the bottom of the pack overlying said band; a generally vertically reciprocable punch engageable with the top of said pack and means cyclically operable for downwardly reciprocating said punch to force the pack down out of the transfer assembly into the die assembly whereby the pack carries with it and bends the cover band to a condition wherein said band partly encircles the pack and the opposite ends of the band protrude above the top of the pack; generally horizontally reciprocable folder means engageable with the outer sides of the protruding band ends, and means cyclically operable to reciprocate said folder means inwardly to fold said band ends in over the top end of the pack in overlapping relation, including means cyclically operable for bonding said overlapping ends; and power actuator means operative according to a predetermined timed schedule for operating all of said cyclically operable means, means supporting a stack of cover bands of prescribed length, applicator means for cyclically applying an adhesive coating to an end portion of each topmost band of the stack, and means for placing the coated topmost band across the tops of said die plates.

References Cited in the file of this patent

UNITED STATES PATENTS

| | | |
|---|---|---|
| 1,123,606 | Smith | Jan. 5, 1915 |
| 1,135,077 | Tamlinson | Apr. 13, 1915 |
| 1,913,727 | Shaffer | June 13, 1933 |
| 2,506,021 | Holmberg | May 2, 1950 |
| 2,917,884 | Winkler | Dec. 22, 1959 |